United States Patent
Mizuno et al.

(10) Patent No.: US 7,054,074 B2
(45) Date of Patent: May 30, 2006

(54) OBJECTIVE LENS AND OPTICAL PICKUP APPARATUS, INFORMATION RECORDING/REPRODUCING APPARATUS

(75) Inventors: Takeshi Mizuno, Tokyo (JP); Takatoshi Yamada, Kanagawa (JP)

(73) Assignee: Sony Corporation (JP)

( * ) Notice: Subject to any disclaimer, the term of this patent is extended or adjusted under 35 U.S.C. 154(b) by 446 days.

(21) Appl. No.: 10/462,770

(22) Filed: Jun. 17, 2003

(65) Prior Publication Data

US 2003/0231536 A1 Dec. 18, 2003

(30) Foreign Application Priority Data

Jun. 17, 2002 (JP) ............................ P2002-175459

(51) Int. Cl.
*G02B 13/18* (2006.01)
*G11B 7/00* (2006.01)

(52) U.S. Cl. .................. 359/719; 359/717; 369/112.01
(58) Field of Classification Search ........ 359/717–719; 264/2.5; 501/900–903; 369/112.01, 112.23
See application file for complete search history.

(56) References Cited

U.S. PATENT DOCUMENTS

| | | | | |
|---|---|---|---|---|
| 3,774,991 A | * | 11/1973 | Shimizu | ...................... 359/745 |
| 6,028,720 A | * | 2/2000 | Wartmann et al. | .......... 359/758 |
| 6,388,822 B1 | * | 5/2002 | Kitamura et al. | ............ 359/793 |
| 6,413,894 B1 | * | 7/2002 | Sato | ............................ 501/77 |
| 6,424,465 B1 | * | 7/2002 | Suzuki | ........................ 359/557 |
| 6,856,587 B1 | * | 2/2005 | Kim et al. | ................. 369/53.3 |

* cited by examiner

*Primary Examiner*—Georgia Epps
*Assistant Examiner*—M. Hasan
(74) *Attorney, Agent, or Firm*—Rader, Fishman & Grauer PLLC; Ronald P. Kananen (57) ABSTRACT

An objective lens is configured of a first crown-glass lens and a second flint-glass lens, whereby it can exhibit substantially identical optical properties at a plurality of recording/reproducing light source wavelengths, particularly, in both 650 nm and 405 nm wavelength bands. Also, by maximizing the difference in glass transition point between the first and second lenses, one of the first and second lenses having a higher glass transition point is molded first, to allow that first molded lens to serve as a mold tool for molding the other lens. This dispenses with the steps of aligning and adhesive bonding the two lenses, whereby this objective lens can be used at a plurality of wavelengths as a single objective lens, and thus an information recording/reproducing apparatus can be of a simple configuration.

13 Claims, 6 Drawing Sheets

OBJECTIVE LENS AND OPTICAL PICKUP APPARATUS, INFORMATION RECORDING/REPRODUCING APPARATUS

BACKGROUND OF THE INVENTION

1. Field of the Invention

The present invention relates to an objective lens for an optical pickup apparatus used to record and reproduce information on and from an optical recording medium by radiating a light beam, such as a laser beam, onto the optical recording medium, and to the optical pickup apparatus using the objective lens, and further to an information recording/reproducing apparatus.

2. Description of Related Art

There is an information recording/reproducing apparatus that records and/or reproduces, by optical means, information on and/or from an optical recording medium such as a CD (Compact Disk) or a DVD (Digital Versatile Disk). The information is read and/or written from and/or to the optical recording medium by radiating light onto the optical recording medium and detecting the intensity or the like of the reflected light therefrom.

There is a growing need for ever larger recording capacities of optical recording media. One solution to meet this need would be to shorten light source wavelengths for reading and/or writing information on the optical recording medium. For example, a DVD-formatted, 12 cm optical recording medium typically uses a 650 nm read/write laser beam. When the wavelength of the laser beam is shortened to 405 nm, and if optical systems exhibiting the same condensing performance as that at 650 nm are used, the recording capacity can be increased by a factor of substantially 2.6.

However, a shorter recording/reproducing wavelength of 405 nm would not be compatible with a DVD-compliant recording/reproducing wavelength of 650 nm. Furthermore, in a DVD recording/reproducing apparatus, its optical systems are usually modified so as to, for example, reproduce information from CD media. Thus, compatibility with existing CDs would also have to be considered.

Another solution would be to ensure compatibility with such conventional media (DVDs or the like) using optical systems suitable for a plurality of wavelengths (e.g., 650 nm and 405 nm). If as many optical systems (e.g., objective lenses) as the plurality of wavelengths are mounted, such another solution would be feasible. However, this solution would also involve an increased number of parts, a further complication of tracking and focus servo mechanisms, or the like, which would further elevate the manufacturing cost of the information recording/reproducing apparatus disadvantageously.

SUMMARY OF THE INVENTION

To satisfy the above and other needs, the present invention provides an objective lens for recording/reproducing information, an optical pickup apparatus using the objective lens, and an information recording/reproducing apparatus which can record and/or reproduce information on/from an optical recording medium at a plurality of wavelengths, in a simple configuration.

In one embodiment, the present invention provides an objective lens, which is a doublet lens comprising: a first lens made of a crown glass material having a refractive index of between 1.55 and 1.6, and an Abbe number of between 58 and 62, and having a first surface and second surface; and a second lens made of a flint glass material having a refractive index of between 1.68 and 1.82, and an Abbe number of between 30 and 41, and having a third surface and a fourth surface, a geometry of the third surface matching the second surface. The first and second lenses each have a different glass transition point.

By configuring the objective lens of the first crown-glass lens and the second flint-glass lens, substantially identical optical properties can be ensured at a plurality of wavelengths, particularly, in both 650 nm and 405 nm wavelength bands. As a result, this objective lens is usable as a single objective lens at a plurality of wavelengths, whereby an information recording/reproducing apparatus can be of a simple configuration.

In this embodiment, the crown and the flint glass materials may include a combination of SK11 and SF15, which are products of Schott Glass Technologies, and a combination of BAL35 (or BAL42) and TIM28 (or LAH53), which are products of Ohara Inc., for example.

Also, by maximizing the difference in glass transition point between the first and second lenses, one of the first and second lenses having a higher glass transition point is molded first to allow the first molded lens to serve as a mold tool for molding the other lens, whereby when fabricating an objective lens having two lenses in contact, one can dispense with the steps of aligning and adhesive bonding the two lenses.

In other embodiments, the present invention provides an optical pickup apparatus and an information recording/reproducing apparatus, each comprising: a first light source from which an light beam of a first wavelength is emitted; a second light source from which an light beam of a second wavelength differing from the first wavelength is emitted; a doublet objective lens for converging the light beam emerging from each of the light sources onto an optical recording medium; and a light detecting element for detecting the light beam reflected off a recording surface of the optical recording medium. The objective lens comprises: a first lens made of a crown glass material having a refractive index of between 1.55 and 1.6 and an Abbe number of between 58 and 62, and having a first surface and a second surface; and a second lens made of a flint glass material having a refractive index of between 1.68 and 1.82 and an Abbe number of between 30 and 41, and having a third surface and a fourth surface, a geometry of the third surface matching the second surface. The first and second lenses each have a different glass transition point.

By configuring the objective lens of the first and second lenses, substantially identical optical properties can be ensured at a plurality of light source wavelengths, particularly, in both 650 nm and 405 nm wavelength bands.

As a result, this objective lens is usable as a single objective lens to focus the first and second wavelengths, whereby the information recording/reproducing apparatus can be of a simple configuration.

In these embodiments, the first wavelength is shorter than the second wavelength, and the second wavelength can be set to 650 nm or between 640 nm and 660 nm. When the second wavelength is set to substantially 650 nm, the apparatuses also become usable to record and/or reproduce conventional DVD-compatible optical recording media. Additionally, when the first wavelength is made shorter than the second wavelength, an optical recording medium having a larger recording capacity than a DVD can be provided. For example, by shortening the first wavelength to 405 nm or between 400 nm and 410 nm, the recording capacity can be increased by 2.6 times compared to a DVD, for an optical recording medium of equal surface area to the DVD under equal focusing performance.

The information recording/reproducing apparatus may also have a third light source that emits light at a third wavelength differing from both the first and second wavelengths. When the third wavelength is set to, for example, 780 nm, the information recording/reproducing apparatus can, for example, reproduce information from CD optical recording media as well.

The information recording/reproducing apparatus may include an aberration compensator, which is placed between the second light source and an optical path combining unit for correcting aberrations, whereby the apparatus can, for example, reproduce CD-compatible optical recording media without the third light source.

As described above, the present invention can provide an objective lens, an optical pickup apparatus, and an information recording/reproducing apparatus which can record/reproduce information to/from an optical recording medium at a plurality of light source wavelengths in a simple configuration.

BRIEF DESCRIPTION OF THE DRAWINGS

The above and other features and advantages of the present invention will become more apparent from the following description of the presently exemplary preferred embodiment of the present invention taken in conjunction with the accompanying drawings, in which.

DESCRIPTION OF THE PREFERRED EMBODIMENTS

Embodiments of the present invention will now be described in detail with reference to the attached drawings.

Figure 1:
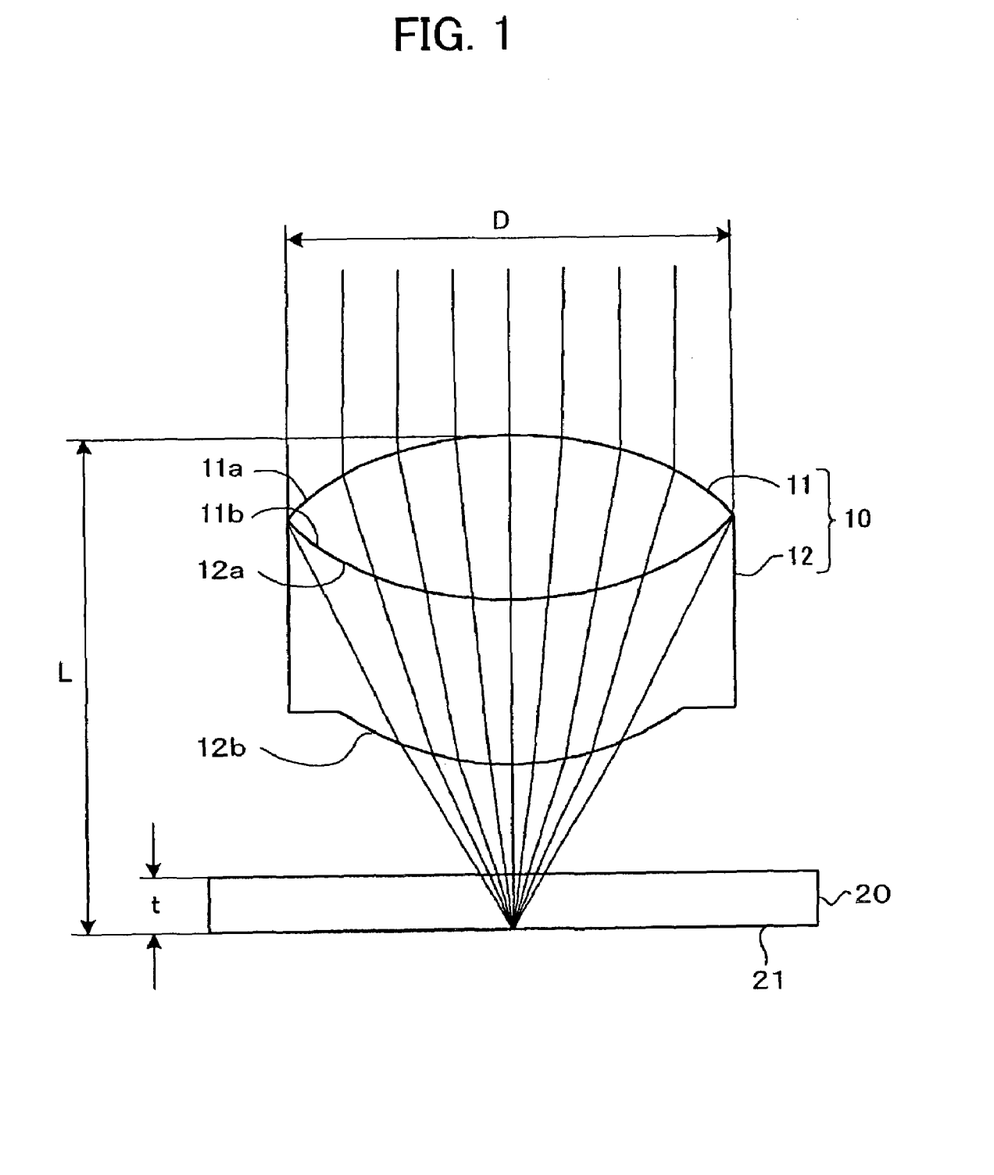
FIG. 1 is a side view representing an objective lens according to an embodiment of the present invention.

FIG. 1 is a side view of an objective lens 10 according to an embodiment of the invention. The objective lens 10 is disposed opposite an optical recording medium 20 to converge light onto and the reflected light off a recording surface 21 of the optical recording medium 20. The objective lens 10 is optically coupled to the optical systems of an information recording/reproducing apparatus 100, which will be described below, through substantially parallel light. Note that in FIG. 1, D is the entrance pupil diameter, L is the distance from the upper surface of the objective lens 10 to the recording surface 21, and t is the thickness of the optical recording medium 20, and their specific numerical values will be described later.

The objective lens 10 consists of a first lens 11 on the side of a light source and a second lens 12 on the side of the optical recording medium 20. By combining the first and second lenses 11 and 12, the objective lens 10 has its optical properties made substantially identical for a plurality of wavelengths (thus constituting an achromatic lens known in the art). This is to enable a single common objective lens 10 to perform reading/writing of information to/from the optical recording medium 20 at different wavelengths; and under this configuration, the optical systems of the information recording/reproducing apparatus 100 of a multi-wavelength type can be simplified.

The first lens 11 has a spherical or aspherical convex surface 11a on the light source side (light entering side) and a spherical or aspherical convex surface 11b on the optical recording medium 20 side (light focusing side). The first lens 11 is made of crown glass. The second lens 12 has a concave surface 12a so shaped as to fit and contact the convex surface 11b and a spherical or aspherical convex or concave surface 12b on the optical recording medium 20 side. The second lens 12 is made of flint glass.

The reason why the first and second lenses 11 and 12 are made of different materials is to make the optical properties of the objective lens 10, such as its refractive index, equal for a plurality of wavelengths through proper combination of materials having different Abbe numbers (different wavelength dispersion properties). The reason why the first and second lenses 11 and 12 are in contact is to reduce reflections at their boundary.

In addition, when the difference in glass transition point between the crown and the flint glass is maximized, and if one of the first and second lenses having a higher glass transition point is molded first, then the first molded lens can be used as a mold tool for molding the other lens, whereby when fabricating an objective lens having two lenses in contact, one can dispense with the steps of aligning and adhesive bonding the two lenses.

Method of Manufacturing the Objective Lens 10

Figure 2:
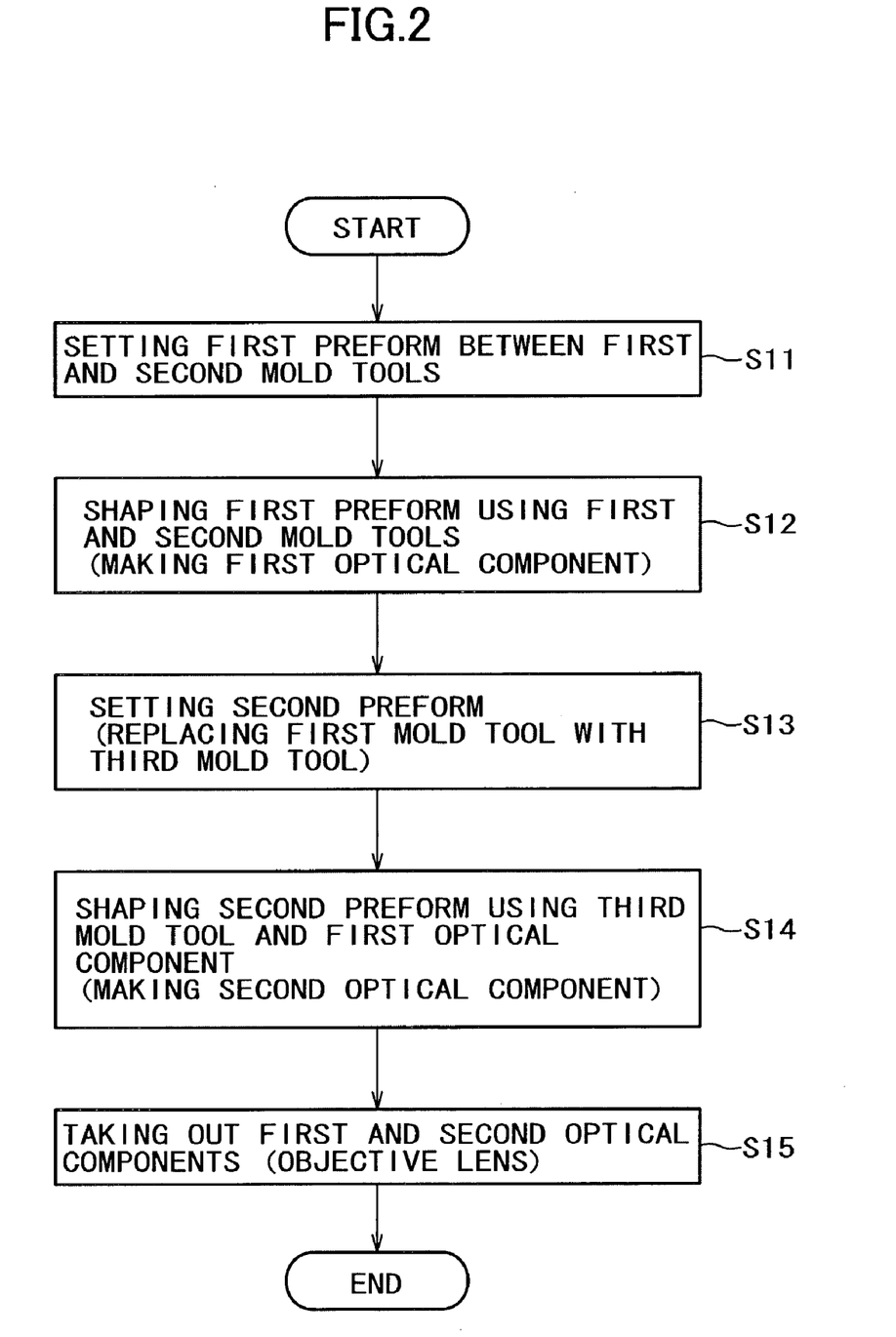
FIG. 2 is a flow diagram representing an example of a method of manufacturing the objective lens.

The first and second lenses 11 and 12 can be manufactured using a mold. Referring next to FIGS. 2 through 8, a method will be described in which the two lenses 11 and 12 are manufactured using one of them as a mold tool to form the other. FIG. 2 is a flowchart illustrating a procedure for manufacturing the objective lens 10; and FIGS. 3 through 8 are sectional views of states of the mold during the manufacture.

In the method herein proposed, the second lens 12 is fabricated first, which will hence require that its material have a higher glass transition point Tg than the material of the first lens 11. Under this condition, the use of a higher glass transition point material for a first prepared lens would permit the use of the first prepared lens as a mold tool for preparing the subsequent lens. For the sake of simplicity, first and second optical components will be called OC1 and OC2 in the order of manufacture of these lenses 11 and 12.

Figure 3:
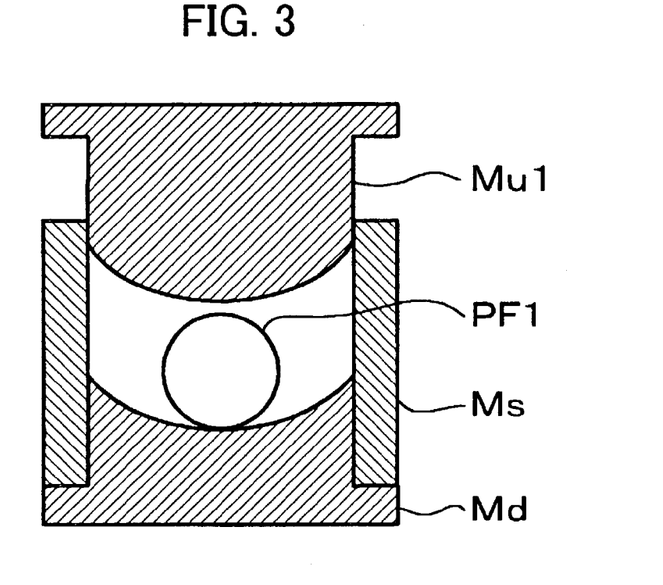
FIG. 3 is a sectional view representing a state of a mold and the like in a procedure for manufacturing the objective lens.

(1) Setting a First Preform between First and Second Mold Tools (Step S11, FIG. 3).

Shown in FIG. 3 is a case where an upper mold tool Mu1 and a lower mold tool Md are used as first and second mold tools. In the figure, the first upper mold tool Mu1, the lower mold tool Md, and a side drum mold support Ms are set up together to form a mold cavity corresponding to the geometry of the first optical component OC1. The vertically disposed upper and lower mold halves Mu1 and Md are held by the flanking drum mold support Ms. The upper mold tool Mu1 is vertically slidable along the inner wall of the drum mold support Ms.

A first preform PF1 is placed into the mold as follows. For example, with the first upper mold tool Mu1 pulled out of the drum mold support Ms, the first preform PF1 is placed on the lower mold tool Md, and then the first upper mold tool Mu1 is inserted into the drum mold support Ms. Note that the first preform PF1 is the material of which the first optical component OC1 is made. This material is prepared first by dividing a liquid raw material, in which a plurality of materials are mixed and melted as so required, into portions each being in such a quantity as to match the size of the first optical component OC1, and then by cooling and solidifying each resultant portion.

Figure 4:
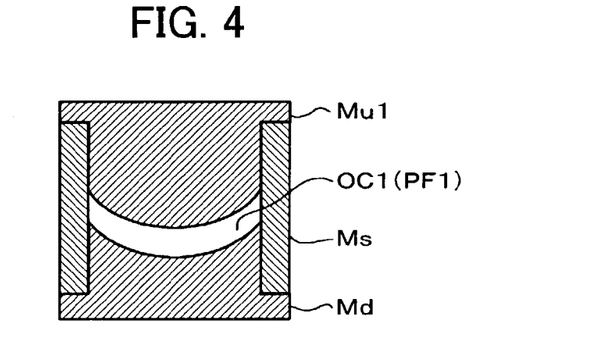
FIG. 4 is a sectional view representing a state of the mold and the like in the procedure for manufacturing the objective lens.

(2) Shaping the First Preform Using the First and Second Mold Tools (Step S12, FIG. 4)

Then, the first preform PF1 is shaped by heating and thereby softening. This thermal shaping forms the first preform PF1 into the designed geometry of the first optical component OC1.

Specifically, the first preform PF1 is softened, by heating means, such as a heater or infrared radiation. Thus, with the first preform PF1 softened, the first upper mold tool Mu1 nears the lower mold tool Md to apply pressure to the first preform. As a result, the first preform PF1 is shaped to correspond to the respective geometries of the lower surface of the first upper mold tool Mu1 and the upper surface of the lower mold tool Md. The first preform PF1 thus shaped is then cooled and solidified, whereby the first optical component OC1 is fabricated. This is how the first optical component OC1 is manufactured from the first preform PF1.

Figure 5:
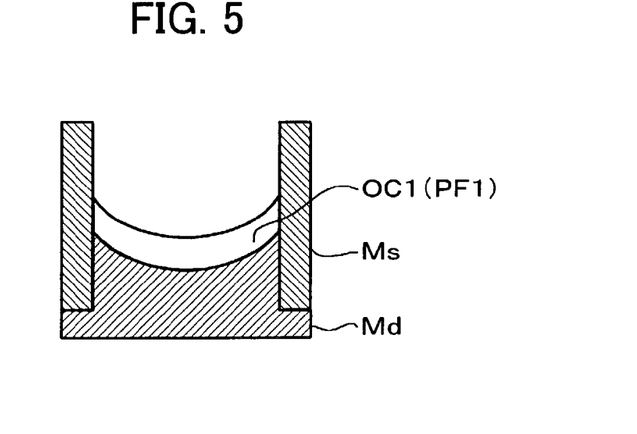
FIG. 5 is a sectional view representing a state of the mold and the like in the procedure for manufacturing the objective lens.
Figure 6:
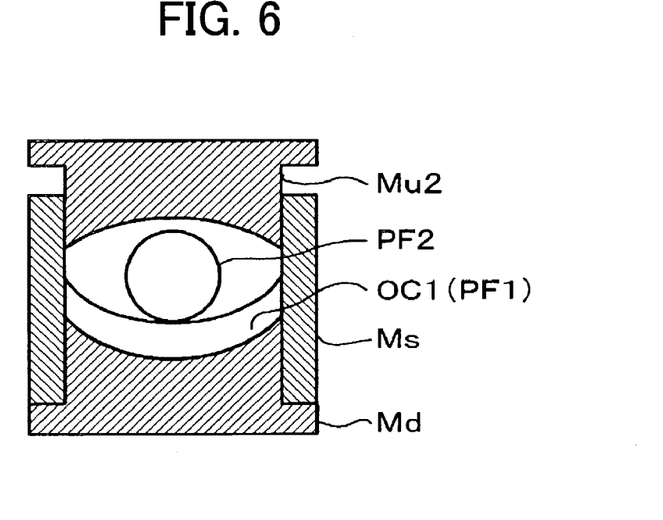
FIG. 6 is a sectional view representing a state of the mold and the like in the procedure for manufacturing the objective lens.

(3) Setting a Second Preform PF2 (Step S13, FIGS. 5 and 6).

In this step, a second preform PF2 is placed, and also the first mold tool is replaced with a third mold tool.

This step is further divided into the following substeps (1) to (3).

(1) Removing the First Mold Tool (FIG. 5)

After the first optical component OC1 has been fabricated, the first mold tool (the first upper mold tool Mu1 in the figure) is pulled out of the drum mold support Ms, thereby leaving the first optical component OC1 on the lower mold tool Md.

(2) Placing the Second Preform

Then, the second preform PF2 is placed on the first optical component OC1.

Note that the second preform PF2 is the material of which the second optical component OC2 is made, and it can be prepared by substantially the same technique as that of preparing the first preform PF1.

(3) Mounting the Third Mold Tool (FIG. 6)

Next, the third mold tool (a second upper mold tool Mu2 in the figure) is inserted into the drum mold support Ms.

In this way, the second preform PF2 is interposed between the third mold tool (the second upper mold tool Mu2) and the first optical component OC1 (placing the second preform PF2 into the mold).

Figure 7:
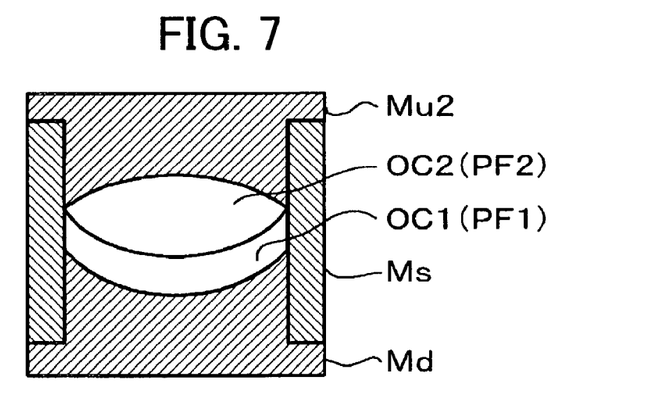
FIG. 7 is a sectional view representing a state of the mold and the like in the procedure for manufacturing the objective lens.

(4) Shaping the Second Preform Using the Third Mold Tool and the First Optical Component OC1 (Step S14, FIG. 7)

Then, the second preform PF2 is shaped by heating and thereby softening. This thermal shaping provides the second preform PF2 with the designed geometry of the second optical component OC2. At this point of the procedure, the first optical component OC1 is not softened, due to its material having a glass transition point Tg sufficiently higher than that of the second preform PF2. Hence, the first optical component OC1 functions as the lower mold tool for the second preform PF2. For example, if the difference in glass transition point Tg between the first and second optical components OC1 and OC2 is large enough, it is possible to use one of the optical components as a mold tool for the other.

Specifically, the second preform PF2 is heated to be softened or melted. Then, with the second preform PF2 thus softened, the third mold tool (the second upper mold tool Mu2) is moved closer to the first optical component OC1 to press the second preform PF2. As a result, the second preform PF2 is so shaped as to match the respective shapes of the lower surface of the second upper mold tool Mu2 and the upper surface of the first optical component OC1. When cooled and solidified, the shaped second preform PF2 is made into the second optical component OC2.

As described above, the second optical component OC2 is fabricated from the second preform PF2. At this point of the procedure, the lower surface of the second preform PF2 matches in shape with the upper surface of the first optical component OC1 and is also in contact with the first optical component OC1.

Figure 8:
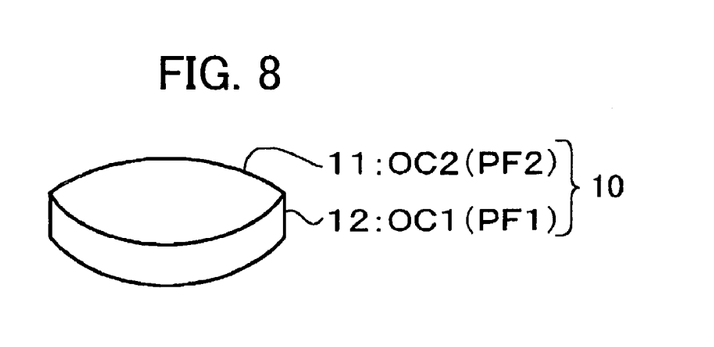
FIG. 8 is a sectional view representing a state of the mold and the like in the procedure for manufacturing the objective lens.

(5) Taking Out the First and Second Optical Components (Step S15, FIG. 8)

After being adequately cooled, the second optical component OC2 is released and taken from the mold as being in contact with the first optical component OC1. These optical components can be taken out by, for example, pulling the second upper mold tool Mu2 out of the drum mold support Ms. The first and second optical components OC1 and OC2 constitute the objective lens 10 as a doublet lens (the second and first lenses 12 and 11 combined).

The objective lens 10 taken out of the mold is likely to have residual internal stresses caused at the time of its shaping. Since these internal stresses would degrade its optical properties, the objective lens 10 is annealed, whenever necessary, to remove them. Specifically, the objective lens 10 is heated up to a temperature lower than its glass transition temperature and gradually cooled afterwards. In this way, the objective lens 10 is manufactured.

Specific Example of the Objective Lens 10

Next, a specific exemplary configuration of the objective lens 10 will be described. The objective lens 10 is supposed to be used at wavelengths $\lambda$ of 405 nm ($\lambda 1$) and 650 nm ($\lambda 2$).

The wavelength $\lambda 1$ is used to implement high-resolution reading and writing on the optical recording medium 20, whereby to increase its recording density. By contrast, the wavelength $\lambda 2$, which is typically used by DVD media, is used to make the objective lens 10 compatible with any conventional DVD (to implement reading and writing when the conventional DVD is used as the optical recording medium 20). For implementation at both wavelength $\lambda 1$ and $\lambda 2$, the optical recording medium 20 is assumed to be of equal configuration and material to typical DVD media. Specifically, the optical recording medium 20 is supposed to be a polycarbonate disk having a thickness t, to ensure compatibility with existing DVDs.

The objective lens 10 is also assumed to achieve, through a proper combination of the first and second lenses 11 and 12, a numerical aperture NA of 0.65 at both wavelengths $\lambda 1$ and $\lambda 2$, whereas an infinite optical system of parallel light is employed at the light source's side. The NA is set to 0.65 in consideration of compatibility with the existing DVDs.

Shown below are the overall aspects of example designs. Note that some CD specifications are also indicated for reference purposes.

| A. Example design 1 | |
|---|---|
| Wavelengths $\lambda$: | 405 nm, 650 nm |
| Optical recording medium: | |
| Material: | Polycarbonate |
| Thickness t: | 0.6 mm (for 405 nm, 650 nm (DVD-compatible)) |
| Numerical aperture NA: | 0.65 (for 405 nm, 650 nm (DVD-compatible)) |
| | 0.45 (for 780 nm (CD-compatible (for reference))) |
| Glass material: | |
| First lens (11): | SK11 |
| Second lens (12): | SF15 |
| Magnification: | −1 (exit side)/∞ (entrance side) |
| Entrance pupil diameter (D): | 2.9250 mm |
| Exit pupil diameter: | 4.5297 mm |
| Effective focal distance: | 2.2500 mm |
| Back length: | 0.3109 mm |
| Distance (L) from the uppersurface of the lens to the recording surface: | 3.67726 mm |

The glass materials SK11 and SF15 are product numbers of Schott Glass Technologies, and their refractive indices nd, Abbe numbers vd, and glass transition points Tg [° C.] are as follows.

SK11: nd=1.56384, vd=60.8, Tg=604
SF15: nd=1.69895, vd=30.1, Tg=455

Alternatively, materials supplied by Ohara Inc. can also be used instead of the above combination. Some feasible Ohara combinations (1) to (4) are proposed below. Needless to say that optical materials other than those supplied by Schott and Ohara can, of course, be appropriately selected.

(1) BAL35 (in place of SK11), TIM28 (in place of SF15)
(2) BAL35 (in place of SK11), LAH53 (in place of SF15)
(3) BAL42 (in place of SK11), TIM28 (in place of SF15)
(4) BAL42 (in place of SK11), LAH53 (in place of SF15)

Their refractive indices nd, Abbe numbers vd, and glass transition points Tg [° C.] are as follows.

(1) BAL35
  S-BAL35: nd=1.58913, vd=61.2, Tg=699
  L-BAL35: nd=1.58913, vd=61.2, Tg=527

(2) BAL42
  S-BAL42: nd=1.58913, vd=59.4, Tg=550
  L-BAL42: nd=1.58913, vd=59.4, Tg=506

(3) TIM28
  S-TIM28: nd=1.68893, vd=31.1, Tg=611
  L-TIM28: nd=1.68893, vd=31.1, Tg=504

(4) LAH53
  S-LAH53: nd=1.80610, vd=40.9, Tg=610
  L-ALH53: nd=1.80610, vd=40.9, Tg=574

Note that in the above Ohara's glass material information, L denotes a low glass transition point-compatible product and S denotes an ordinary product.

Here, by properly selecting combinations where Tg (K)<Tg (F) (where Tg (K) is the glass transition point of crown glass and Tg (F) is that of flint glass is Tg (F)), the first lens 11 can be shaped by using the second lens 12 as the mold tool, as mentioned above. Some such combinations are suggested below.

(1) L-BAL35 (Tg=527) and S-TIM28 (Tg=611)
(2) L-BAL35 (Tg=527) and S-LAH53 (Tg=610) or L-LAH53 (Tg=574)
(3) L-BAL42 (Tg=506) and S-TIM28 (Tg=611)
(4) L-BAL42 (Tg=506) and S-LAH53 (Tg=610) or L-LAH53 (Tg=574)

Another example design 2 is shown, which is the above (3) BAL42-TIM28 combination.

| B. Exemplary design 2 | |
|---|---|
| Wavelengths $\lambda$: | 405 nm, 650 nm |
| Optical recording medium: | |
| Material: | Polycarbonate |
| Thickness t: | 0.6 mm (for 405 nm, 650 nm (DVD-compatible)) |
| Numerical aperture NA: | 0.65 (for 405 nm, 650 nm (DVD-compatible)) |
| | 0.45 (for 780 nm (CD-compatible)) |
| Glass material: | |
| First lens (11): | BAL42 |
| Second lens (12): | TIM28 |
| Magnification: | −1 (exit side)/∞ (entrance side) |
| Entrance pupil diameter (D): | 3.3573 mm |
| Exit pupil diameter: | 15.6421 mm |
| Effective focal distance: | 2.50055 mm |
| Back length: | 0.4017 mm |
| Distance (L) from the upper surface of the lens to the recording surface: | 4.900874 mm |

Figure 9:
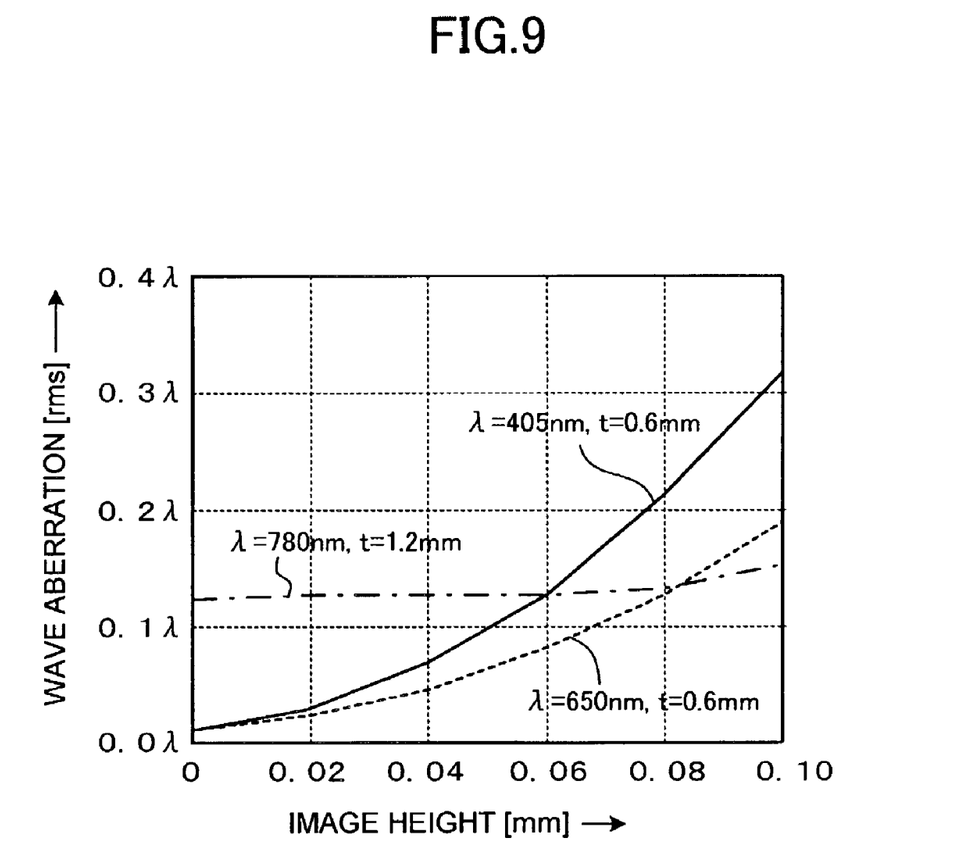
FIG. 9 is a graph representing the relationship between image height and spherical aberration when the objective lens is disposed opposite an optical recording medium.

FIG. 9 is a graph showing a relationship between image height and spherical aberration in the example design 2 ($\lambda$=650 nm, 405 nm). Here, the solid line indicates a case where $\lambda$=405 nm, NA=0.65, and t=0.6 mm (short wavelength-compatible). The broken line indicates a case where $\lambda$=650 nm, NA=0.65, and t=0.6 mm (DVD-compatible). The chain line indicates a case where $\lambda$=780 nm, NA=0.45, and t=1.2 mm (CD-compatible).

It is understood from FIG. 9 that the image height property (change in wave front aberration with image height) is within a practical range at both wavelengths 405 nm and 650 nm. It is also understood that despite the fact that the example design 2 is originally directed to the optical recording medium 20 (t=0.6 mm) for use at $\lambda$=405 nm or 650 nm, the design 2 is satisfactory for a CD-compatible optical recording medium 20 ($\lambda$=780 nm and t=1.2 mm), with its wave front aberration being smaller than 0.2 $\lambda$. Although it is mainly spherical aberrations that would be caused by $\lambda$=780 nm, these spherical aberrations would be within the range well correctable by using spherical aberration compensators 115 and 125, which will be described later. Hence, it can be understood that the example design 2 would be practical for CD applications as well.

In summary, the objective lens 10 can be configured as follows.

(1) The objective lens 10 is designed such that its optical properties are suitable for two wavelengths (e.g., 650 nm and 405 nm) when used for optical recording media 20 each of which is made of the same material (e.g., polycarbonate) and has the same thickness t (e.g., 0.6 mm). Additionally, the optical lens 10 may have a numerical aperture NA (e.g., in the order of 0.6 to 0.65) at both of these two wavelengths. Specifically, the objective lens 10 allows information in various DVD formats to be read or written using a wavelength of the 650 nm range. The objective lens 10 also enables information to be reproduced from optical recording media 20 of equal material and thickness to typical DVD disks, under a wavelength of the 405 nm range.

Furthermore, the objective lens 10 could be applied to multi-layered optical recording media 20. Specifically, the lens 10 could implement reading/writing of DVD formats ($\lambda$=650 nm) double-layered at a gap of about 20 to 50 nm or of other disks physically equivalent thereto at a different wavelength ($\lambda$=405 nm).

Additionally, it would be preferable to make the objective lens 10 usable at a third wavelength, for example, $\lambda$=780 nm, so that information can be read or written from or to CD-formatted media as well. This could be more effectively realized when spherical aberration compensators are jointly used, as mentioned above.

(2) The objective lens 10 is formed by combining the first and second lenses 11 and 12 made of crown glass and flint glass, whereby its wavelength properties can be properly controlled for two wavelengths. As the crown glass, one can select any material having a refractive index of between 1.55 and 1.6 and an Abbe number of between 58 and 62, and as the flint glass, one can select any material having a refractive index of between 1.68 and 1.82 and an Abbe number of between 30 and 41. Specifically, BAL and TIM glass products supplied by Ohara Inc. can be used as the materials of the first and second lenses 11 and 12.

(3) The first and second lenses 11 and 12 are made of materials having different glass transition points, whereby a first made lens can serve as a mold tool for a second lens. This technique dispenses with the step of adhesive bonding the two lenses together, and thus the objective lens 10 can be manufactured through only two glass molding cycles. In this case, it would be preferable if the difference in glass transition point between the materials of the first and second lenses 11 and 12 is somewhat large. For example, any combination of materials in which the difference in the materials' glass transition point is 30° C. or higher, or more preferably, 40° C. or higher, or further more preferably, 50° C. or higher would be selectable.

Overall Configuration of the Information Recording/Reproducing Apparatus 100

Figure 10:
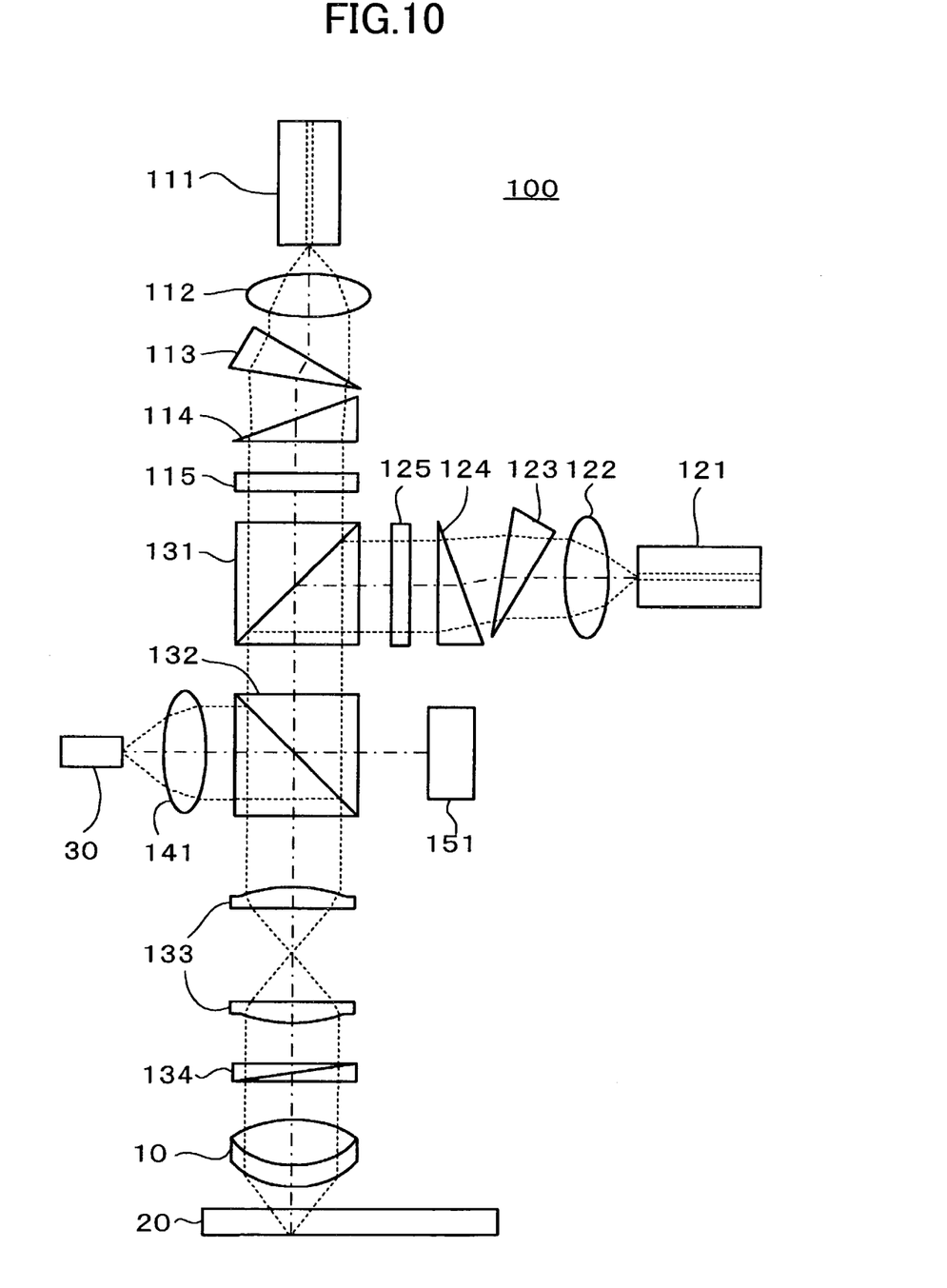
FIG. 10 is a schematic diagram representing the overall configuration of an information recording/reproducing apparatus 100.

FIG. 10 is a schematic diagram showing the overall configuration of the information recording/reproducing apparatus 100. As shown in the figure, the information recording/reproducing apparatus 100 has as optical systems thereof for the first wavelength $\lambda 1$ a light source 111, a collimator lens 112, anamorphic prisms 113 and 114, and a spherical aberration compensator 115. The apparatus 100 also has as optical systems thereof for the second wavelength $\lambda 2$ a light source 121, a collimator lens 122, anamorphic prisms 123 and 124, and a spherical aberration compensator 125.

The information recording/reproducing apparatus 100 further includes a dichroic combiner 131, a polarization beam splitter 132, afocal optical systems 133, a quarter-wavelength plate (QWP) 134, the objective lens 10, the optical recording medium 20, a condenser lens 141, a light detecting unit 30, and a front monitor photo diode 151.

The information recording/reproducing apparatus 100 has scanning means (not shown) for scanning the optical recording medium 20 with a light beam emitted from the light source 111 or 121. For example, the optical recording medium 20 is arranged to spin, and the objective lens 10 is made movable radially relative to the spinning center of the medium 20, whereby almost all the surface of the optical recording medium 20 can be scanned via a beam from the objective lens 10.

Any disk conforming to DVD standards can be used as the optical recording medium 20, including, for example, disks compatible with optical systems designed for use at a wavelength of 650 nm and a numerical aperture NA about 0.6 to 0.65, such as DVD-Video, DVD-ROM, DVD-R, DVD+R, DVD-RW, DVD+RW, and DVD-RAM media. Also, at a wavelength of 405 nm, disks compatible with optical systems specified for a numerical aperture NA in the order of 0.6 to 0.65 can similarly be used. The optical recording medium 20 includes DVD-formatted disks double-layered at a gap of approximately 20 to 50 nm and disks having a substantially similar physical configuration to the above, which are usable in the 405 nm range.

The optical recording medium 20 may further include wavelength of 780 nm, CD-formatted disks and other disks compliant therewith; provided that disks insensitive to wavelength of 650 nm dye disks are excluded. That is, disks compatible with a wavelength of 780 nm, a numerical aperture NA of 0.45 to 0.5, and a thickness of 1.2 mm are included. In this case, it would be preferable to further optimize the optical systems using the spherical aberration compensator 125. Note that a third light source (wavelength: $\lambda$=780 nm) will be required if the dye disks (e.g., CD-Rs) are included.

The light source 111 is a semiconductor laser emitting a wavelength $\lambda 1$ of, for example, 405 nm. The shorter the wavelength, the higher the resolution for reading/writing from/to the optical recording medium 20. The collimator lens 112 converts light emitted from the light source 111 into a flux of substantially parallel lights.

The anamorphic prisms 113 and 114 constitute an anamorphic optical system that converts light from the collimator lens 112 into a beam that has a profile corresponding to the dichroic combiner 131.

The light source 121 is a semiconductor laser emitting a wavelength $\lambda 2$ of, for example, 650 nm, to ensure compatibility with the conventional DVDs. Since the collimator lens 122 and anamorphic prisms 123 and 124 are not dissimilar in nature from the collimator lens 112 and the like of the optical systems for $\lambda 1$, except for the wavelength they pass therethrough, descriptions thereof will be omitted. The spherical aberration compensator 125 is used when CD-compatible media in the $\lambda$=780 nm range are to be reproduced.

The dichroic combiner 131 is an optical element that combines optical paths of a plurality of wavelengths. Here, it combines the paths of light rays emitted from the light sources 111 and 121, respectively. The polarization beam splitter 132 is another optical element that transmits a predetermined component of polarization and reflects other component(s) of polarization. The polarization beam splitter 122 should preferably have equivalent optical properties at both wavelengths λ1 and λ2. The afocal optical systems 133 consists of a pair of lenses, and by changing the distance between these lenses, it adjusts the converging position of light from the light source 121 on the optical recording medium 20, whereby a depth-wise position for reading or the like can be properly selected. The QWP 134 is an optical element that introduces a phase difference of a quarter wavelength between orthogonally polarized light components. It also would be desirable that the QWP 134 has equivalent optical properties at both wavelengths λ1 and λ2.

The objective lens 10 is so adjusted, as described above, so that its optical properties are suitable for lights (wavelength λ1 or λ2) from both light source 111 and 121.

The condenser lens 141 focuses light onto the light detecting unit 30. The front monitor photo diode 151 monitors outputs from the light sources 111 and 121.

Operation of the Information Recording/Reproducing Apparatus 100

The light at the wavelength XI from the light source 111 is converted into substantially parallel light by the collimator lens 112 and properly shaped by the anamorphic prisms 113 and 114 for entrance into the dichroic combiner 131. The light at the wavelength λ2 from the light source 121 is likewise converted into substantially parallel light by the collimator lens 122 and suitably shaped by the anamorphic prisms 123 and 124 to enter the dichroic combiner 131 via the spherical aberration compensator 125.

As mentioned above, both wavelengths λ1 and λ2 enter the dichroic combiner 131, in which the optical paths of the respective wavelengths are combined into one identical path for entrance into the polarization beam splitter 132. The beam past the polarization beam splitter 132, enters, via the afocal optical systems 133, the QWP 134 for conversion into circularly polarized light. The circularly polarized light is then focused by the objective lens 10 onto the recording surface 21 of the optical recording medium 20. Note that part of the light incident on the polarization beam splitter 132 is reflected off a surface (PBS surface) thereof. The reflected light enters the front monitor photo diode 151 to have the output monitored thereby.

The light incident on the optical recording medium 20 is reflected off its recording surface 21 to be circularly polarized reflected light the rotating direction of which is opposite to the direction at the time of its entrance. This reflected light is converted by the QWP 134, past the objective lens 10, into linearly polarized light the orientation of which is orthogonal to the orientation at the time of its entrance. The linearly polarized light passing through the anamorphic optical systems 133 is bounced off the PBS surface of the polarization beam splitter 132 and then focused by the condenser lens 141 onto the light detecting unit 30 to generate RF signals or the like. As a result, information can be, for example, read (reproduced) from the optical recording medium 20.

The information recording/reproducing apparatus 100 according to this embodiment has the following features and advantages.

(1) Its DVD-compatible optical systems permit reading/writing of information from/to the optical recording medium 20 at λ=405 nm, whereby the recording capacity can be increased by substantially 2.6 times, compared to typical DVD media.

(2) The apparatus 100 opens the way to use of optical systems compatible with various DVD formats including DVD-Video, DVD-ROM, DVD-R, DVD+R, DVD-RW, DVD+RW, and DVD-RAM formats, whereby DVD resources so far accumulated can be effectively utilized.

(3) A single objective lens 10 is usable at a plurality of wavelengths, whereby the apparatus 100 can adopt tracking and focus servo mechanisms similar to the existing ones. That is, the sharing of a single objective lens 10 with a plurality of wavelengths and some other configurational aspects prevent the number of parts from increasing, which will, in turn, result in reducing the manufacturing cost of the information recording/reproducing apparatus 100.

(4) When the objective lens 10 is of a doublet configuration having two lenses bonded together, the lens materials having different glass transition points allow one of the lenses, when formed, to serve as a mold tool for the other during fabrication of the objective lens 10. This dispenses with the steps of aligning and adhesive bonding the two lenses, which likewise contributes to reducing the manufacturing cost of the information recording/reproducing apparatus 100.

(5) The information recording/reproducing apparatus 100 could, in a case, be made compatible even with three or more wavelengths. In this case, it would be effective to use a spherical aberration compensator jointly with one of the two light sources, whereby compatibility even with, for example, CD formats, can be provided.

Other Embodiments

The present invention is not limited to the above-described embodiment; it can be expanded or modified to other embodiments. Expanded or modified embodiments are also included in the technical scope of the present invention.

(1) While the optical component manufacturing method is disclosed taking a doublet objective lens as an example, this method is also applicable to the manufacture of other types of optical components. This above-disclosed method teaches that as long as a plurality of optical components are combined together with adjacent ones of their surfaces contacting each other, one of these optical components can be used as a mold tool for another to manufacture a final optical product.

(2) While the objective lens is manufactured in the order of the second and first lenses, this order may be reversed in some cases. If the glass transition point of a first prepared optical component is higher (more heat resistant in a broader sense) than that of a next prepared optical component, then the first prepared optical component can be used as a mold tool for fabrication of the next optical product.

(3) The number of optical components is not limited to two. A combination of three or more optical components can be manufactured. For example, an achromatic triplet lens can be made. Even in the case of combining three or more optical components together, if fabrication of one of the optical components having a higher glass transition point precedes that of a next optical component, the first fabricated optical component can be used as a mold tool for the next. As an alternative, these optical components can be sequentially laminated one upon another. As another alternative, first and second ones of these optical components can be prepared separately to be used as the upper and lower mold halves for a third optical component, whereby the third optical component can be interposed therebetween to fabricate a finished optical product. In the latter alternative, the magnitude of the glass transition point of each of the first and second optical components is not so critical.

(4) Note that the information recording/reproducing apparatus may be of either a fixed type in which optical recording media are normally installed or a removable type in which optical recording media are detachably installed. In the case of the removable type, the information recording/reproducing apparatus is provided with optical recording medium holding means such as a stage (table) to hold the optical recording medium or media.

Although the invention having been described hereinabove in its preferred form with a certain degree of particularity, other changes, variations, combinations and subcombinations are possible therein. It is therefore to be understood that modifications will be practiced otherwise than as specifically described herein without departing from the scope and spirit of the present invention.

The invention claimed is:

1. An objective lens which is a doublet for converging a light beam emitted from a light source onto an optical recording medium, said objective lens comprising:
   a first lens made of a crown glass material having a refractive index of between 1.55 and 1.6, and an Abbe number of between 58 and 62, and having a first surface and second surface;
   a second lens made of a flint glass material having a refractive index of between 1.68 and 1.82, and an Abbe number of between 30 and 41, and having a third surface and a fourth surface, wherein a geometry of said third surface matches said second surface, wherein
   a glass transition point of said first lens is different from that of said second lens, and
   a difference of said glass transition points of said first and second lenses is 30° C. or higher.

2. The objective lens according to claim 1, wherein said first and second lenses are formed by glass molding.

3. The objective lens according to claim 1, wherein after forming said first or second lens by glass molding, one of said surfaces of said formed first or second lens which contacts one of said surfaces of the other lens is used as a mold tool to mold said other lens, whereby to configure said objective lens.

4. An optical pickup apparatus comprising:
   a first light source from which a light beam of a first wavelength is emitted;
   a second light source from which a light beam of a second wavelength differing from said first wavelength is emitted;
   a doublet objective lens for converging said light beam emitted from each of said light sources onto an optical recording medium; and
   a light detecting element for detecting said light beam reflected off a recording surface of said optical recording medium,
   wherein said objective lens comprises:
   a first lens made of a crown glass material having a refractive index of between 1.55 and 1.6, and an Abbe number of between 58 and 62, and having a first surface and second surface; and
   a second lens made of a flint glass material having a refractive index of between 1.68 and 1.82, and an Abbe number of between 30 and 41, and having a third surface and a fourth surface, wherein a geometry of said third surface matches said second surface, wherein
   a glass transition point of said first lens is different from that of said second lens, and
   a difference of said glass transition points of said first and second lenses is 30° C. or higher.

5. The optical pickup apparatus according to claim 4, wherein said first and second lenses are formed by glass molding.

6. The optical pickup apparatus according to claim 4, wherein after forming said first or second lens by glass molding, one of said surfaces of said formed first or second lens which contacts one of said surfaces of the other lens is used as a mold tool to mold said other lens, whereby to configure said objective lens.

7. The optical pickup apparatus according to claim 4, wherein said first wavelength is shorter than said second wavelength; and said second wavelength is substantially equal to 650 nm.

8. The optical pickup apparatus according to claim 4, wherein said first wavelength is substantially equal to 405 nm.

9. An information recording/reproducing apparatus comprising:
   a first light source from which a light beam of a first wavelength is emitted;
   a second light source from which a light beam of a second wavelength differing from said first wavelength is emitted;
   a doublet objective lens for converging said light beam from each of said light sources onto an optical recording medium; and
   a light detecting element for detecting said light beam reflected off a recording surface of said optical recording medium, wherein said objective lens comprises:
   a first lens made of a crown glass material having a refractive index of between 1.55 and 1.6, and an Abbe number of between 58 and 62, and having a first surface and second surface; and
   a second lens made of a flint glass material having a refractive index of between 1.68 and 1.82, and an Abbe number of between 30 and 41, and having a third surface and a fourth surface, wherein a geometry of said third surface matches said second surface, wherein
   a glass transition point of said first lens is different from that of said second lens, and
   a difference of said glass transitions points of said first and second lenses is 30° C. or higher.

10. The information recording/reproducing apparatus according to claim 9, wherein said first and second lenses are formed by glass molding.

11. The information recording/reproducing apparatus according to claim 9, wherein after forming said first or second lens by glass molding, one of said surfaces of said formed first or second lens which contacts one of said surfaces of the other lens is used as a mold tool to mold said other lens, whereby to configure said objective lens.

12. The information recording/reproducing apparatus according to claim 9, wherein said first wavelength is shorter than said second wavelength; and
   said second wavelength is substantially equal to 650 nm.

13. The information recording/reproducing apparatus according to claim 9, wherein said first wavelength is substantially equal to 405 nm.

* * * * *